United States Patent [19]

Allan et al.

[11] Patent Number: 4,796,567
[45] Date of Patent: Jan. 10, 1989

[54] PROTECTIVE BAG FOR HANDLING POTS

[76] Inventors: Nancy J. Allan; Lorraine J. Allan, both of 6633 Elwell St., Burnaby, B.C., Canada, V5E 1J9

[21] Appl. No.: 67,717

[22] Filed: Jun. 26, 1987

[51] Int. Cl.[4] .................. A01K 29/00; A01D 11/00
[52] U.S. Cl. .................................................. 119/158
[58] Field of Search .......................... 119/1, 158, 159

[56] References Cited

U.S. PATENT DOCUMENTS

| | | | |
|---|---|---|---|
| 663,417 | 12/1900 | Clayton | 119/158 |
| 2,969,767 | 1/1961 | Bassett | 119/1 |
| 3,150,640 | 9/1964 | Nevitt | 119/1 |
| 3,150,641 | 9/1964 | Kesh | 119/1 X |
| 3,263,653 | 8/1966 | Miller | 119/158 |
| 3,972,309 | 8/1976 | Cortner | 119/159 |

Primary Examiner—Robert Peshock
Attorney, Agent, or Firm—Workman, Nydegger & Jensen

[57] ABSTRACT

A bag for use in handling and bathing cats or other pets which assists the attendant in controlling the animal is disclosed. The bag is formed of a nylon mesh which allows the passage of water. The bag has an open end which is placed over the animal, and a closed end. The open end allows the insertion of the hands of the attendant. The closed end has an opening in the upper corner through which the pet's head extends and a square lower corner which allows the pet's paws to be extended for support.

9 Claims, 2 Drawing Sheets

PROTECTIVE BAG FOR HANDLING POTS

BACKGROUND OF THE INVENTION

The invention relates to the field of accessories for grooming pets, and in particular to a protective bag for bathing and grooming pets.

Household pets, such as cats, require periodic bathing by the owner. Such bathing is normally carried out in a household sink or basin. Generally the pet does not enjoy such bathing and puts up some resistance, which may result in scratching of the attendant by the claws of the pet. Various devices have been designed to facilitate the pet-bathing process. For example, U.S. Pat. No. 3,263,653 issued Aug. 2, 1966 to Miller, U.S. Pat. No. 3,749,064 issued July 31, 1973 to Weinstein et al. and U.S. Pat. No. 4,083,328 issued Apr. 11, 1978 to Baker all disclose flexible bag structures which are designed to receive a pet and allow the head of the pet to extend from the bag for purposes of bathing the pet. In all of these designs, however, the water is retained in the interior of the bag and consequently complicated structures are required to permit the attendant to carry out the washing procedure.

SUMMARY OF THE INVENTION

The present invention provides a simple and inexpensive protective bag for assisting in handling and controlling pets such as cats during bathing or grooming. The bag takes the form of a flexible sack constructed of a water-permeable mesh. The sack has an open end sized appropriately to receive the pet, and a substantially closed end. The closed end has an aperture through which the head of the pet may be extended. The aperture may have a drawstring or other means for securing the bag around the neck of the animal. Preferably the mesh is formed of a waterproof cord such as nylon. Preferably the mesh has between four (4) and twelve (12) open spaces per inch. The lower corner of the closed end may also be constructed to provide a square end to allow the pet to extend its paws for support.

BRIEF DESCRIPTION OF THE DRAWINGS

In drawings which illustrate a preferred embodiment of the invention.

DETAILED DESCRIPTION OF A PREFERRED EMBODIMENT OF THE INVENTION

Referring to FIGS. 1 through 4, the protective bag of the invention is designated as 1. It is constructed of a nylon mesh which readily allows water to flow through it. In the preferred form the mesh has approximately eight openings per inch, although any mesh which allows a mixture of water and soap suds to drain readily through it, while still preventing the passage of the animals paws, would be suitable. Thus generally a mesh having greater than about three openings per inch would be suitable. Approximately eight openings per inch is preferred, although a range of four to twelve openings per inch provides sufficient protection while allowing suitable washing action.

While nylon is preferred, other materials are suitable to form the fibers of the mesh. Waterproof or water resistant fibers are preferred for their improved performance and longer life when subjected to repeated soaking.

Figure 1:
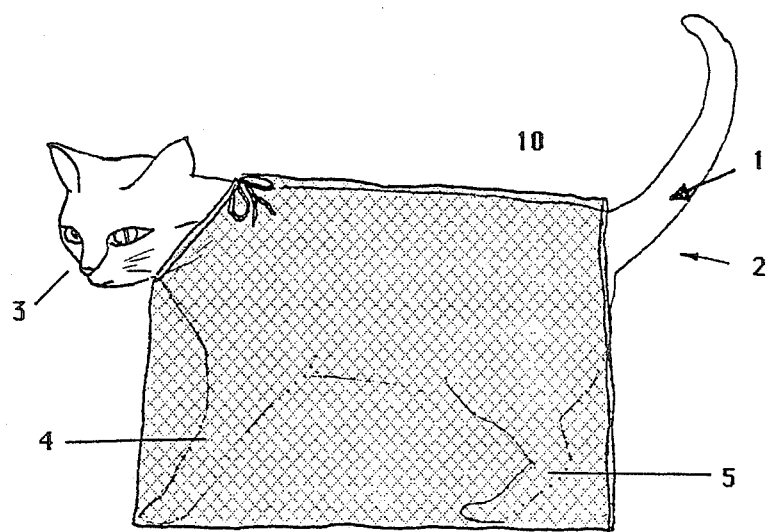
FIG. 1 is a perspective view illustrating a cat contained in the bag of the invention in position for bathing.
Figure 2:
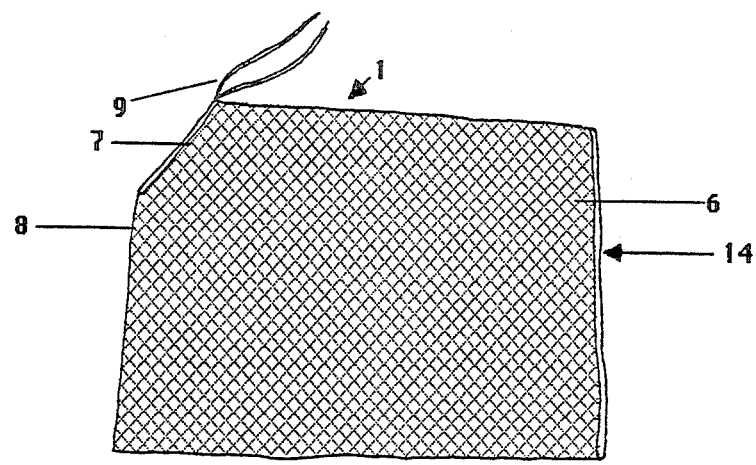
FIG. 2 is a side view of the bag of the invention.
Figures 3, 4:
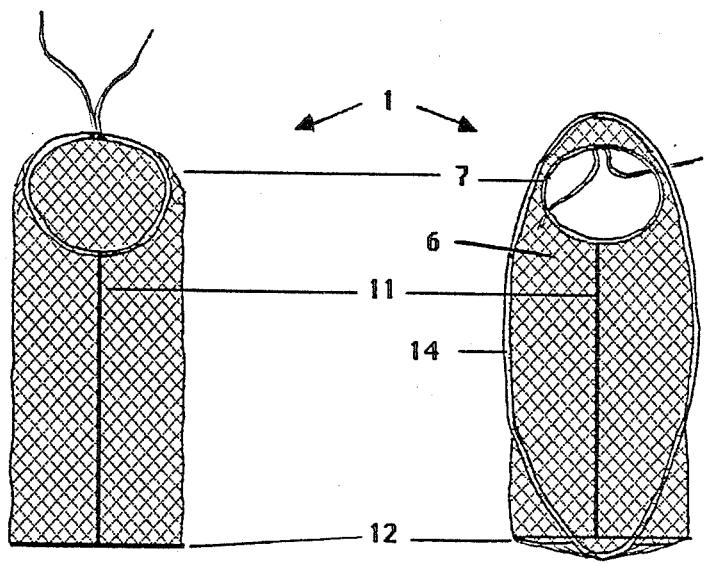
FIG. 3 is an end view of the open end of the bag of the invention.
FIG. 4 is an end view of the closed end of the invention.

In FIG. 1, the household cat is designated as 2, and has a head 3, forelegs 4 and rear legs 5. Bag 1 has an opening 6 which allows the bag to be passed over the cat. The head 3 of the cat extends through opening 7 in the upper corner of the closed end 8 of the bag. Opening 7 may have a drawstring 9 which allows the opening 7 to be tightened around the neck of the cat. Open end 6 may also have means for closing the opening. However typically it will not, to allow ready insertion of attendant's hands for washing or grooming the animal.

The bag 1 is preferably formed of a single piece of nylon mesh material with seams formed at locations 10, 11 and 12. A hem 14 may be formed around opening 6, and also around opening 7 to receive the drawstring 9. The presence of seams 11 and 12 forms a square portion in the front lower corner of the bag which facilitates the extension of the pets paws for support.

For use of the bag in bathing cats, an appropriate size for opening 6 has been found to be approximately 14.5 inches in height. A 0.5 inch hem is provided at 14. The length of the bag is approximately 21.5 inches. Head opening 7 is approximately 6 inches in diameter. This results in a top back seam 10 of approximately 16.75 inches. Front seam 11 is approximately 10 inches and bottom front seam 12 is approximately 6 inches. After the bottom front seam is installed, the length of the bottom of the bag from front to back is approximately 18.5 inches.

To bathe the cat, the cat is placed in a sink and opening 6 of the bag is placed over the cat. The head of the cat is extended through opening 7 and drawstring 9 is tightened and secured to draw the edges of opening 7 around the neck of the cat. The forelegs of the cat are positioned along seam 12. In this position, the sink can be partially filled with water and the cat's fur washed either from the exterior of the bag or by the handler inserting a hand through opening 6. The cat can also be rinsed and dried using a blow dryer through the nylon mesh.

The bag of the invention may also be used to handle the pet while combing, pilling, clipping claws, treating the pet's ears for mites, applying flea powder and similar uses.

As will be apparent to those skilled in the art in light of the foregoing disclosure, many alterations and modifications are possible in the practice of this invention without departing from the spirit or scope thereof. Accordingly, the scope of the invention is to be construed in accordance with the substance defined by the following claims.

We claim:

1. A bag for containing a pet while the pet is being bathed or groomed, said bag comprising a water-permeable mesh having an open end sized to receive the pet and a substantially closed end, and having adjacent said closed end an aperture formed in said bag for allowing the passage of the head of the pet.

2. The bag of claim 1 wherein said mesh is formed of a water-proof fiber.

3. The bag of claim 2 wherein said water-proof fiber is nylon.

4. The bag of claim 1 wherein said mesh has at least three openings per inch.

5. The bag of claim 4 wherein said mesh has between four and twelve openings per inch.

6. The bag of claim 5 wherein said mesh has eight openings per inch.

7. The bag of claim 1 further comprising means for constricting said aperture about the neck of said pet.

8. The bag of claim 1 formed from a single piece of mesh material.

9. The bag of claim 1 further comprising a seam adjacent the lower corner of said closed end to provide a square corner for receiving the front paws of said pet.

* * * * *

UNITED STATES PATENT AND TRADEMARK OFFICE
CERTIFICATE OF CORRECTION

PATENT NO. : 4,796,567

DATED : January 10, 1989

INVENTOR(S) : Allan et al.

It is certified that error appears in the above-identified patent and that said Letters Patent is hereby corrected as shown below:

Title, cover page, "PROTECTIVE BAG FOR HANDLING POTS" should be --PROTECTIVE BAG FOR HANDLING PETS--

Column 2, line 24, "pets paws" should be --pet's paws--

Signed and Sealed this

Twenty-fourth Day of October, 1989

Attest:

DONALD J. QUIGG

Attesting Officer

Commissioner of Patents and Trademarks

UNITED STATES PATENT AND TRADEMARK OFFICE
CERTIFICATE OF CORRECTION

PATENT NO. : 4,796,567

DATED : January 10, 1989

INVENTOR(S) : Nancy J. Allan, et al

It is certified that error appears in the above-identified patent and that said Letters Patent is hereby corrected as shown below:

Column 1, line 1, in the title, "PROTECTIVE BAG FOR HANDLING POTS"

should be --PROTECTIVE BAG FOR HANDLING PETS--.

Signed and Sealed this

Thirtieth Day of March, 1993

Attest:

STEPHEN G. KUNIN

Attesting Officer

Acting Commissioner of Patents and Trademarks